United States Patent
Vignoli

(10) Patent No.: US 7,885,818 B2
(45) Date of Patent: Feb. 8, 2011

(54) CONTROLLING AN APPARATUS BASED ON SPEECH

(75) Inventor: Fabio Vignoli, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 544 days.

(21) Appl. No.: 10/532,469

(22) PCT Filed: Sep. 22, 2003

(86) PCT No.: PCT/IB03/04203

§ 371 (c)(1),
(2), (4) Date: Apr. 22, 2005

(87) PCT Pub. No.: WO2004/038697

PCT Pub. Date: May 6, 2004

(65) Prior Publication Data

US 2006/0074686 A1    Apr. 6, 2006

(30) Foreign Application Priority Data

Oct. 23, 2002    (EP) .................................. 02079421

(51) Int. Cl.
G10L 21/00    (2006.01)
(52) U.S. Cl. .................. 704/275; 704/246; 704/247; 704/251; 704/252
(58) Field of Classification Search .................. 704/275
See application file for complete search history.

(56) References Cited

U.S. PATENT DOCUMENTS

| | | | |
|---|---|---|---|
| 5,749,072 A * | 5/1998 | Mazurkiewicz et al. ..... | 704/275 |
| 5,906,870 A * | 5/1999 | Lo .............................. | 428/16 |
| 6,868,045 B1 * | 3/2005 | Schroder ..................... | 367/198 |
| 7,050,971 B1 * | 5/2006 | Kaufholz ..................... | 704/226 |
| 7,136,817 B2 * | 11/2006 | Schroder et al. ............ | 704/275 |
| 7,149,691 B2 * | 12/2006 | Balan et al. .................. | 704/270 |
| 2002/0150263 A1 * | 10/2002 | Rajan .......................... | 381/92 |
| 2002/0181723 A1 * | 12/2002 | Kataoka ...................... | 381/92 |
| 2007/0098192 A1 * | 5/2007 | Sipkema ...................... | 381/312 |

FOREIGN PATENT DOCUMENTS

| | | |
|---|---|---|
| EP | 0795851 A2 | 9/1997 |
| EP | 0795851 B1 | 9/1997 |
| EP | 0795851 A3 | 9/1998 |

OTHER PUBLICATIONS

Ubo Bud, et.al; Knowing Who to Listen to in Speech Recongnition; ICASSP 1995; pp. 848-851.

* cited by examiner

*Primary Examiner*—Richemond Dorvil
*Assistant Examiner*—Leonard Saint Cyr

(57) ABSTRACT

An apparatus with a speech control unit includes a microphone array having multiple microphones for receiving respective audio signals, and a beam forming module for extracting a speech signal of a user, from the audio signals. A keyword recognition system recognizes a predetermined keyword that is spoken by the user and which is represented by a particular audio signal and is arranged to control the beam forming module, on basis of tie recognition. A speech recognition unit creates an instruction for the apparatus based on recognized speech items of the speech signal. As a consequence, the speech control unit is more selective for those parts of the audio signals for speech recognition which correspond to speech items spoken by the user.

19 Claims, 3 Drawing Sheets

CONTROLLING AN APPARATUS BASED ON SPEECH

Figure 1:
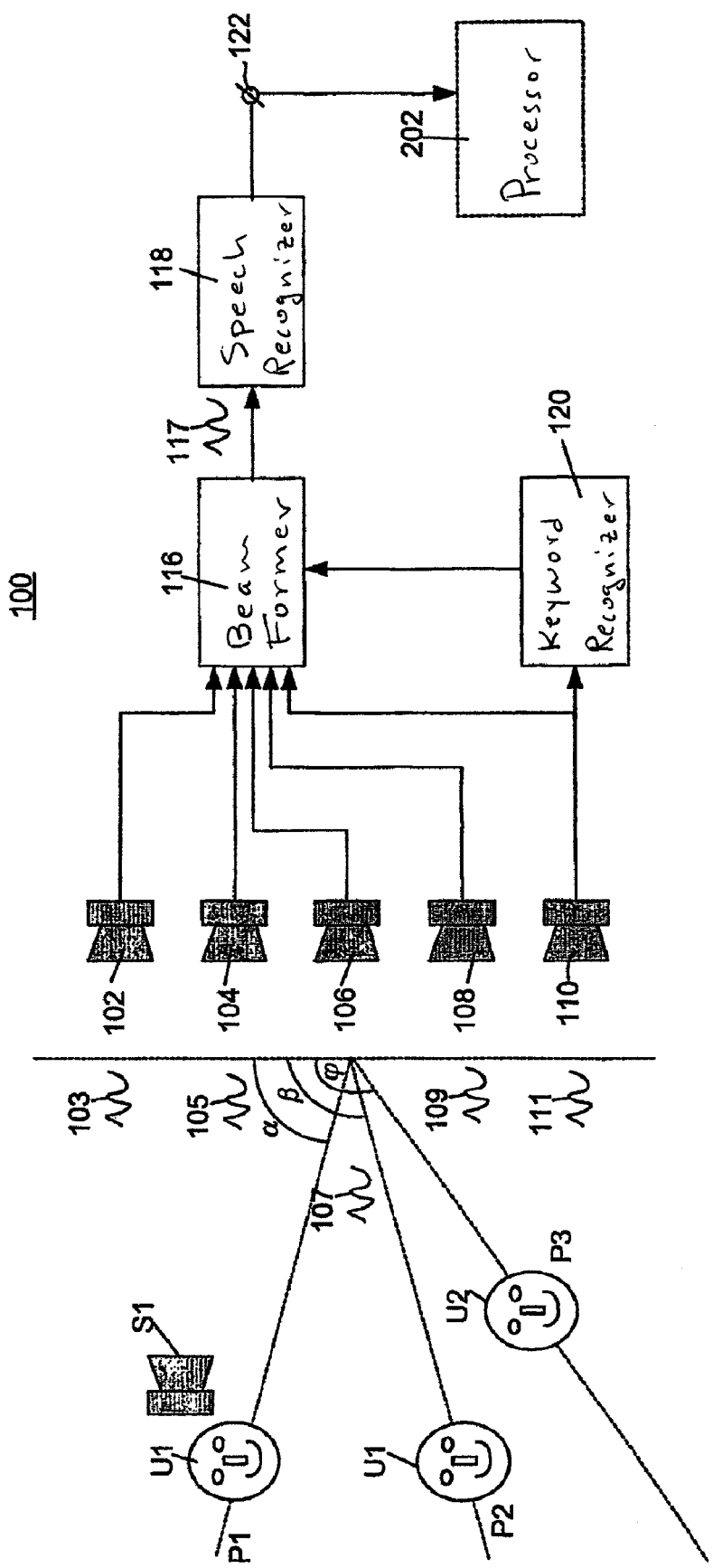

The invention relates to a speech control unit for controlling an apparatus on basis of speech, comprising:
- a microphone array, comprising multiple microphones for receiving respective audio signals;
- a beam forming module for extracting a speech signal of a user, from the audio signals as received by the microphones, by means of enhancing first components of the audio signals which represent an utterance originating from a first orientation of the user relative to the microphone array; and
- a speech recognition unit for creating an instruction for the apparatus based on recognized speech items of the speech signal.

The invention further relates to an apparatus comprising:
- such a speech control unit for controlling the apparatus on basis of speech; and
- processing means for execution of the instruction being created by the speech control unit.

The invention further relates to a method of controlling an apparatus on basis of speech, comprising:
- receiving respective audio signals by means of a microphone array, comprising multiple microphones;
- extracting a speech signal of a user, from the audio signals as received by the microphones, by means of enhancing first components of the audio signals which represent an utterance originating from a first orientation of the user relative to the microphone array; and
- creating an instruction for the apparatus based on recognized speech items of the speech signal.

Natural spoken language is a preferred means for human-to-human communication. Because of recent advances in automatic speech recognition, natural spoken language is emerging as an effective means for human-to-machine communication. The user is being liberated from manipulating a keyboard and mouse, which requires great hand/eye coordination. This hands-free advantage of human to machine communication through speech recognition is particularly desired in situations where the user must be free to use his/her eyes and hands, and to move about unencumbered while talking. However the user is still encumbered in present systems by hand-held, body-worn, or tethered microphone equipment, e.g. headset microphone, which captures audio signals and provides input to the speech recognition unit. This is because most speech recognition units work best with a close-talking microphone input, e.g. with the user and microphone in close proximity. When they are deployed in "real-world" environments, the performance of known speech recognition units typically degrades. The degradation is particularly severe when the user is far from the microphone. Room reverberation and interfering noise contribute to the degraded performance.

In general it is uncomfortable to wear the headset microphone on a head for any extended period of time, while the hand microphone can limit freedom of the user as it occupies the user's hands, and there has been a demand for a speech input scheme that allows more freedom to the user. A microphone array in combination with a beam forming module appears to be a good approach that can resolve the conventionally encountered inconvenience described above. The microphone array is a set of microphones which are arranged at different positions. The multiple audio signals received by the respective microphones of the array are provided to the beam forming module. The beam forming module has to be calibrated, i.e. an orientation or position of a particular sound source relative to the microphone array has to be estimated. The particular sound source might be the source in the environment of the microphone array which generates sound having parameters corresponding to predetermined parameters, e.g. comprising predetermined frequencies matching with human voice. However, often the calibration is based on the loudest sound, i.e. the particular sound source generates the loudest sound. For example, a beam forming module can be calibrated on basis of the user who is speaking loudly, compared to other users in the same environment. A sound source direction or position can be estimated from time differences among signals from different microphones, using a delay sum array method or a method based on the cross-correlation function as disclosed in: "Knowing Who to Listen to in Speech Recognition: Visually Guided Beamforming", by U. Bub, et al. ICASSP'95, pp. 848-851, 1995. A parametric method estimating the sound source position (or direction) is disclosed in S. V. Pillai: "Array Signal Processing", Springer-Verlag, New York, 1989.

After being calibrated, i.e. the current orientation being estimated, the beam forming module is arranged to enhance sound originating from a direction corresponding to the current direction and to reduce noise, by synthetic processing of outputs of these microphones. It is assumed that the output of the beam forming module is a clean signal that is appropriate to be provided to a speech recognition unit resulting in a robust speech recognition. This means that the components of the audio signals are processed such that the speech items of the user can be extracted.

An embodiment of a system comprising a microphone array, a beam forming module and a speech recognition unit is known from European Patent Application EP 0795851 A2. The Application discloses that a sound source position or direction estimation and a speech recognition can be achieved with the system. The disadvantage of this system is that it does not work appropriate in a multi user situation. Suppose that the system has been calibrated for a first position of the user. Then the user starts moving. The system should be re-calibrated first to be able to recognize speech correctly. The system requires audio signals, i.e. the user has to speak something, as input for the calibration. However, if in between another user starts speaking, then the re-calibration will not provide the right result: the system will get tuned to the other user.

It is an object of the invention to provide a speech control unit of the kind described in the opening paragraph which is arranged to recognize speech of a user who is moving in an environment in which other users might speak too.

This object of the invention is achieved in that the speech control unit comprises a keyword recognition system for recognition of a predetermined keyword that is spoken by the user and which is represented by a particular audio signal and the speech control unit being arranged to control the beam forming module, on basis of the recognition of the predetermined keyword, in order to enhance second components of the audio signals which represent a subsequent utterance originating from a second orientation of the user relative to the microphone array. The keyword recognition system is arranged to discriminate between audio signals related to utterances representing the predetermined keyword and to other utterances which do not represent the predetermined keyword. The speech control unit is arranged to re-calibrate if it receives sound corresponding to the predetermined keyword, from a different orientation. Preferably this sound has been generated by the user who initiated an attention span (see also FIG. 3) of the apparatus to be controlled. There will be no re-calibration if the predetermined keyword has not been recognized. As a consequence, speech items spoken from another orientation and which are not preceded by the predetermined keyword, win be discarded.

In an embodiment of the speech control unit according to the invention, the keyword recognition system is arranged to recognize the predetermined keyword that is spoken by another user and the speech control unit being arranged to control the beam forming module, on basis of this recognition, in order to enhance third components of the audio signals which represent another utterance originating from a third orientation of the other user relative to the microphone array. This embodiment of the speech control unit is arranged to re-calibrate on basis of the recognition of the predetermined keyword spoken by another user. Besides, following one particular user, this embodiment is arranged to calibrate on basis of sound from multiple users. That means that only authorized users, i.e. those who have authorization to control the apparatus because they have spoken the predetermined keyword, are recognized as such and hence only speech items from them will be accepted for the creation of instructions for the apparatus.

In an embodiment of the speech control unit according to the invention, a first one of the microphones of the microphone array is arranged to provide the particular audio signal to the keyword recognition system. In other words, the particular audio signal which is used for keyword recognition corresponds to one of the audio signals as received by the microphones of the microphone array. The advantage is that no additional microphone is required.

In an embodiment of the speech control unit according to the invention, the beam forming module is arranged to determine a first position of the user relative to the microphone array. Besides orientation, also a distance between the user and the microphone array is determined. The position is calculated on basis of the orientation and distance. An advantage of this embodiment according to the invention is that the speech control unit is arranged to discriminate between sounds originating from users who are located in front of each other.

It is a further object of the invention to provide an apparatus of the kind described in the opening paragraph which is arranged to be controlled by a user who is moving in an environment in which other users might speak too.

This object of the invention is achieved that the apparatus comprises the speech control unit as claimed in claim 1.

An embodiment of the apparatus according to the invention is arranged to show that the predetermined keyword has been recognized. An advantage of this embodiment according to the invention is that the user gets informed about the recognition.

An embodiment of the apparatus according to the invention which is arranged to show that the predetermined keyword has been recognized, comprises audio generating means for generating an audio signal. By generating an audio signal, e.g. "Hello" it is clear for the user that the apparatus is ready to receive speech items from the user. This concept is also known as auditory greeting.

It is a further object of the invention to provide a method of the kind described in the opening paragraph which enables to recognize speech of a user who is moving in an environment in which other users might speak too.

This object of the invention is achieved that the method is characterized in comprising recognition of a predetermined keyword that is spoken by the user based on a particular audio signal and controlling the extraction of the speech signal of the user, on basis of the recognition, in order to enhance second components of the audio signals which represent a subsequent utterance originating from a second orientation of the user relative to the microphone array.

Modifications of speech control unit and variations thereof may correspond to modifications and variations thereof of the apparatus described and of the method described.

Figure 2:
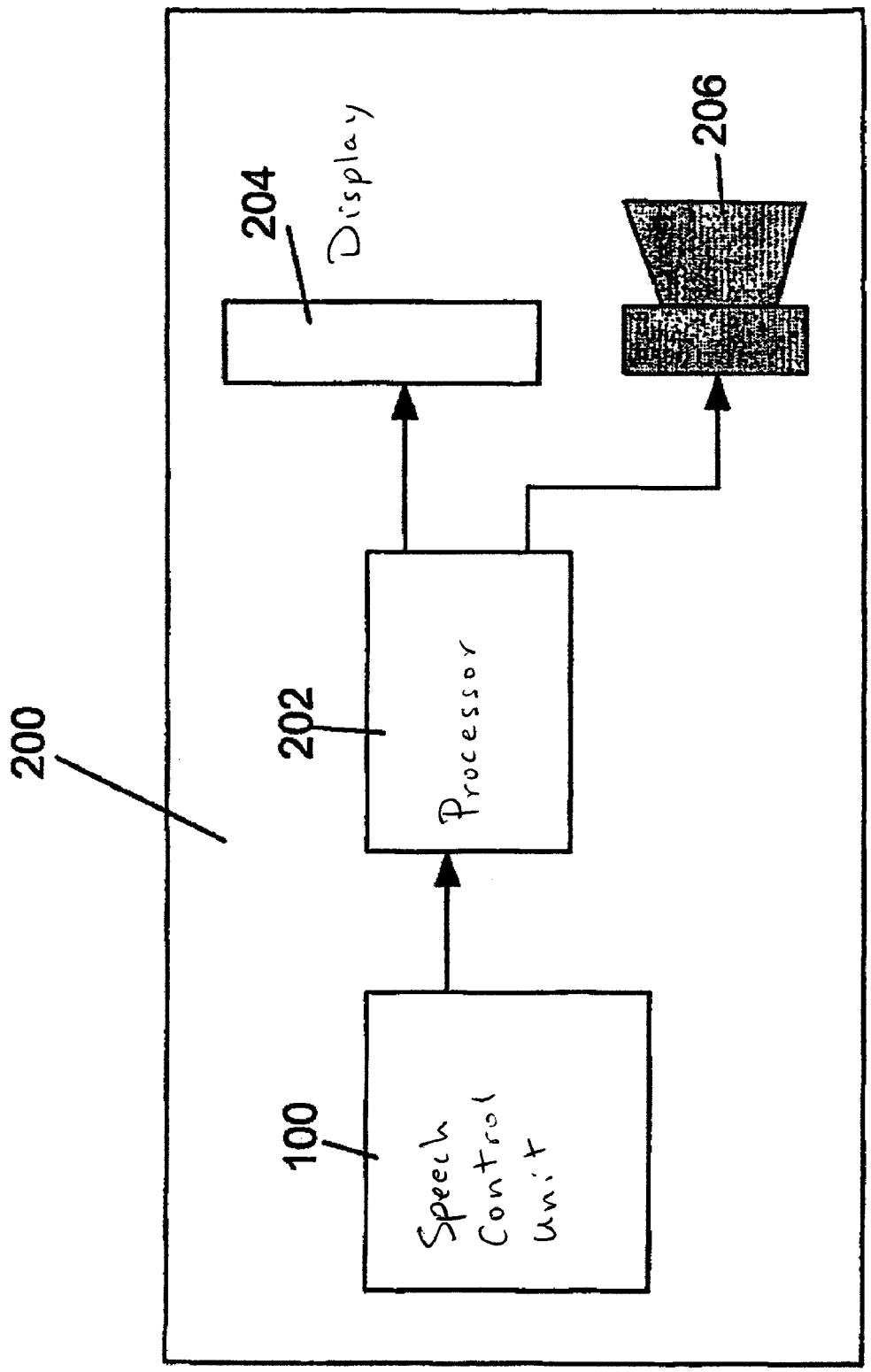
Figure 3:
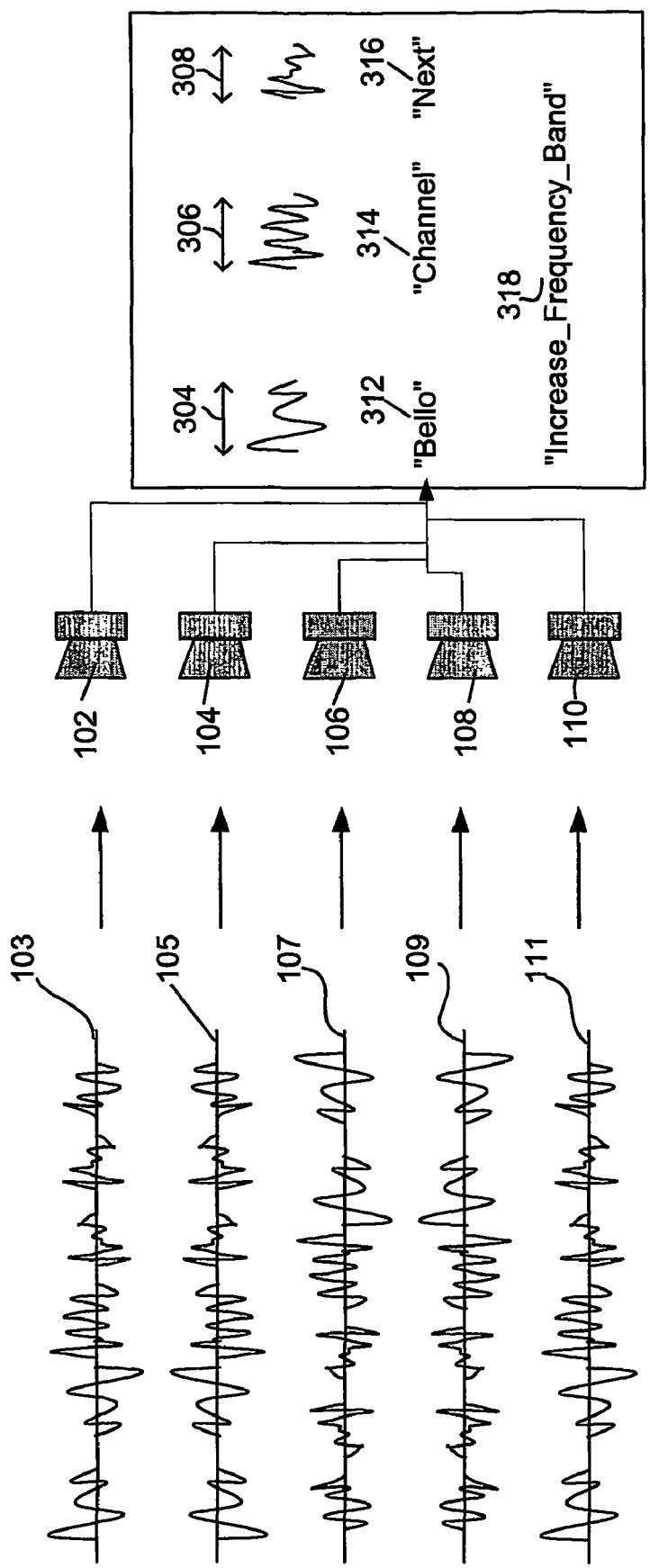

These and other aspects of the speech control unit, of method and of the apparatus according to the invention will become apparent from and will be elucidated with respect to the implementations and embodiments described hereinafter and with reference to the accompanying drawings, wherein:

FIG. 1 schematically shows an embodiment of the speech control unit according to the invention;

FIG. 2 schematically shows an embodiment of the apparatus according to the invention; and FIG. 3 schematically shows the creation of an instruction on basis of a number of audio signals.

Same reference numerals are used to denote similar parts throughout the Figures.

FIG. 1 schematically shows an embodiment of the speech control unit 100 according to the invention. The speech control unit 100 is arranged to provide instructions to the processing unit 202 of the apparatus 200. These instructions are provided at the output connector 122 of the speech control unit 100, which comprises:

- a microphone array, comprising multiple microphones 102, 104, 106, 108 and 110 for receiving respective audio signals 103, 105, 107, 109 and 111;
- a beam forming module 116 for extracting a clean, i.e. speech, signal 117 of a user U1, from the audio signals 103, 105, 107, 109 and 111 as received by the microphones 102, 104, 106, 108 and 110;
- a keyword recognition system 120 for recognition of a predetermined keyword that is spoken by the user and which is represented by a particular audio signal 111 and being arranged to control the beam forming module, on basis of the recognition; and
- a speech recognition unit 118 for creating an instruction for the apparatus 200 based on recognized speech items of the speech signal 117.

The working of the speech control unit 100 is as follows. It is assumed that initially the speech control unit 100 is calibrated on basis of utterances of user U1 being at position P1. The result is that the beam forming module 116 of the speech control unit 100 is "tuned" to sound originating from directions which substantially match direction $\alpha$. Sound from directions which differ from direction $\alpha$ with more than a predetermined threshold, is disregarded for speech recognition. E.g. speech of user U2, being located at position P2 with a direction $\phi$ relative to the microphone array is neglected. Preferably, the speech control unit 100 is sensitive to sound with voice characteristics, i.e. speech, and is insensitive to others sounds. For instance the sound of the music as generated by the speaker S1, which is located in the vicinity of user U1 is filtered out by the beam forming module 116.

Suppose that user U1 has moved to position P2, corresponding to an orientation $\beta$ relative to the microphone array. Without re-calibration of the speech control unit 100, or more particular the beam forming module 116, the recognition of speech items probably would fail. However the speech control unit 100 will get calibrated again when user U1 starts his speaking with the predetermined keyword. The predetermined keyword as spoken by user U1 is recognized and used for the re-calibration. Optionally further words spoken by the first user U1 which succeed the keyword are also applied for the re-calibration. If another user, e.g. user U2, starts speaking without first speaking the predetermined keyword then his/her utterances are recognized as not relevant and skipped for the re-calibration. As a consequence the speech control unit 100 is arranged to stay "tuned" to user U1 while he/she is moving. Speech signals of this user U1 are extracted from the audio signals 103, 105, 107, 109 and 111 and are basis for speech recognition. Other sounds are not taken into account for the control of the apparatus.

Above it is explained that the speech control unit 100 is arranged to "follow" one specific user U1. This user might be the user who initiated the attention span of the speech control unit. Optionally, the speech control unit 100 is arranged to get subsequently tuned to a number of users.

In FIG. 1 is depicted that the microphone 110 is connected to both the keyword recognition system 120 and the beam forming module 116. This is optional, that means that an additional microphone could have been used. The keyword recognition system 120 might be comprised by the speech recognition unit 118. The components 116-120 of the speech control unit 100 and the processing unit 202 of the apparatus 200 may be implemented using one processor. Normally, both functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

FIG. 2 schematically shows an embodiment of the apparatus 200 according to the invention. The apparatus 200 optionally comprises a generating means 206 for generating an audio signal. By generating an audio signal, e.g. "Hello" it is clear for the user that the apparatus is ready to receive speech items from the user. Optionally the generating means 206 is arranged to generate multiple sounds: e.g. a first sound to indicate that the apparatus is in a state of calibrating and a second sound to indicate that the apparatus is in a state of being calibrated and hence the apparatus is in an active state of recognizing speech items. The generating means 206 comprises a memory device for storage of sampled audio signals, a sound generator and a speaker. Optionally, the apparatus also comprises a display device 204 for displaying a visual representation of the state of the apparatus.

The speech control unit 100 according to the invention is preferably used in a multi-function consumer electronics system, like a TV, set top box, VCR, or DVD player, game box, or similar device. But it may also be a consumer electronic product for domestic use such as a washing or kitchen machine, any kind of office equipment like a copying machine, a printer, various forms of computer work stations etc, electronic products for use in the medical sector or any other kind of professional use as well as a more complex electronic information system. Besides that, it may be a product specially designed to be used in vehicles or other means of transport, e.g. a car navigation system. Whereas, the word "multifunction electronic system" as used in the context of the invention may comprise a multiplicity of electronic products for domestic or professional use as well as more complex information systems, the number of individual functions to be controlled by the method would normally be limited to a reasonable level, typically in the range from 2 to 100 different functions. For a typical consumer electronic product like a TV or audio system, where only a more limited number of functions need to be controlled, e.g. 5 to 20 functions, examples of such functions may include volume control including muting, tone control, channel selection and switching from inactive or stand-by condition to active condition and vice versa, which could be initiated, by control commands such as "louder", "softer", "mute", "bass" "treble" "change channel", "on", "off", "stand-by" etcetera.

In the description it is assumed that the speech control unit 100 is located in the apparatus 200 being controlled. It will be appreciated that this is not required and that the control method according to the invention is also possible where several devices or apparatus are connected via a network (local or wide area), and the speech control unit 100 is located in a different device then the device or apparatus being controlled.

FIG. 3 schematically shows the creation of an instruction 318 on basis of a number of audio signals 103, 105, 107, 109 and 111 as received by the microphones 102, 104, 106, 108 and 110. From the audio signals the speech items 304-308 are extracted. The speech items 304-308 are recognized and voice commands 312-316 are assigned to these speech items 304-308. The voice commands 312-316 are "Bello", "Channel" and "Next", respectively. An instruction "Increase_Frequency_Band", which is interpretable for the processing unit-202 is created based on these voice commands 312-316.

To avoid that conversations or utterances not intended for controlling the apparatus are recognized and executed, the speech control unit 100 optionally requires the user to activate the speech control unit 100 resulting in a time span, or also called attention span during which the speech control unit 100 is active. Such an activation may be performed via voice, for instance by the user speaking a keyword, like "TV" or "Device-Wake-up". Preferably the keyword for initiating the attention span is the same as the predetermined keyword for re-calibrating the speech control unit.

By using an anthropomorphic character a barrier for interaction is removed: it is more natural to address the character instead of the product, e.g. by saying "Bello" to a dog-like character. Moreover, a product can make effective use of one object with several appearances, chosen as a result of several state elements. For instance, a basic appearance like a sleeping animal can be used to show that the speech control unit 100 is not yet active. A second group of appearances can be used when the speech control unit 100 is active, e.g. awake appearances of the animal. The progress of the attention span can then, for instance, be expressed, by the angle of the ears: fully raised at the beginning of the attention span, fully down at the end. The similar appearances can also express whether or not an utterance was understood: an "understanding look" versus a "puzzled look". Also audible feedback can be combined, like a "glad" bark if a speech item has been recognized. A user can quickly grasp the feedback on all such system elements by looking at the one appearance which represents all these elements. E.g. raised ears and an "understanding look", or lowered ears and a "puzzled look". The position of the eyes of the character can be used to feedback to the user where the system is expecting the user to be.

Once a user has started an attention span the apparatus, i.e. the speech control unit 100 is in a state of accepting further speech items. These speech items 304-308 will be recognized and associated with voice commands 312-316. A number of voice commands 312-316 together will be combined to one instruction 318 for the apparatus. E.g. a first speech item is associated with "Bello", resulting in a wake-up of the television. A second speech item is associated with the word "channel" and a third speech item is associated with the word "next". The result is that the television will switch, i.e. get tuned to a next broadcasting channel. If another user starts talking during the attention span of the television just initiated by the first user, then his/her utterances will be neglected.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A system for controlling an apparatus on basis of speech, comprising:
    a microphone array, comprising multiple microphones for receiving respective audio signals;
    a beam forming module for extracting a speech signal of a user, from the audio signals as received by the microphones, by means of enhancing first components of the audio signals which represent an utterance originating from a first position of the user relative to the microphone array;
    a speech recognition unit for creating an instruction for the apparatus based on recognized speech items of the speech signal; and
    a keyword recognition system for recognition of a represented by a particular audio signal;
    a speech control unit being arranged to control the beam forming module, on basis of the recognition of the predetermined keyword, in order to enhance second components of the audio signals which represent a subsequent utterance originating from a second position of the user relative to the microphone array;
    wherein the recognition of the predetermined keyword at the second position calibrates the beam forming module to follow the user from the first position to the second position so that the subsequent utterance originating from the second position are accepted while utterances of other users at other positions are discarded, the second position including an orientation and a distance relative to the microphone array, and the speech control unit being configured to discriminate between sounds originating from users who are located in front of each other relative the microphone array;
    wherein the subsequent utterance originating from the second position will be discarded if not preceded by the recognition of the predetermined keyword originating from the second position; and
    wherein the keyword recognition system is arranged to recognize the predetermined keyword that is spoken by another user and the speech control unit being arranged to control the beam forming module, on basis of this recognition, in order to enhance third components of the audio signals which represent another utterance originating from a third orientation of the other user relative to the microphone array.

2. The system as claimed in claim 1, wherein a first one of the microphones of the microphone array is arranged to provide the particular audio signal to the keyword recognition system.

3. The system as claimed in claim 1, wherein the beam forming module is arranged to determine a first position of the user relative to the microphone array.

4. An apparatus comprising:
    a system for controlling the apparatus on basis of speech as claimed in claim 1; and
    processing means for execution of the instruction being created by the speech control unit.

5. The apparatus as claimed in claim 4, the apparatus arranged to show that the predetermined keyword has been recognized.

6. The apparatus as claimed in claim 5, further comprising audio generating means for generating an audio signal in order to show that the predetermined keyword has been recognized.

7. A consumer electronics system comprising the apparatus as claimed in claim 4.

8. The system of claim 1, wherein the user is informed by indications that the speech control unit is not active, is in an active state and ready to receive the utterance, or is in a state of calibration.

9. The system of claim 8, wherein the indications include an animal in a sleeping state indicating that the speech control unit is not active, and in an awake state indicating that the speech control unit is in the active state.

10. The system of claim 9, wherein progress of the active state is indicated by an angle of ears of the animal.

11. The system of claim 10, wherein the ears are fully raised at a beginning of the active state, and fully down at an end of the active state.

12. The system of claim 9, wherein the animal has an understanding look when the utterance is recognized and a puzzled look when the utterance is not recognized.

13. The system of claim 1, wherein the beam forming module is connected to the microphone array, and the keyword recognition system is connected to one microphone of the microphone array for detecting the predetermined keyword, the keyword recognition system being further connected to the beam forming module for providing the detected predetermined keyword to the beam forming module.

14. A method of controlling an apparatus on basis of speech, comprising the acts of:
    receiving respective audio signals by means of a microphone array, comprising multiple microphones;
    extracting a speech signal of a user, from the audio signals as received by the microphones, by means of enhancing first components of the audio signals which represent an utterance originating from a first position of the user relative to the microphone array;
    recognizing a predetermined keyword that is spoken by based on a particular audio signal and controlling the extraction of the speech signal of the user, on basis of the recognition of the predetermined keyword, in order to enhance second components of the audio signals which represent a subsequent utterance originating from a second position of the user relative to the microphone array while discarding utterances of other users at other positions, the second position including an orientation and a distance relative co the microphone array so that sounds originating from users who are located in front of each other relative the microphone array are discriminated;
    creating an instruction for the apparatus based on recognized speech items of the speech signal;
    discarding the subsequent utterance originating from the second position if not preceded by the recognition of the predetermined keyword originating from the second position; and
    recognizing the predetermined keyword that is spoken by another and extracting a speech signal of the user, on basis of this recognition, in order to enhance third components of the audio signals which represent another utterance originating from a third orientation of the other user relative to the microphone array.

15. The method of claim 14, further comprising the act of informing the user by indications that the apparatus is not active, is in an active state and ready to receive the utterance, or is in a state of calibration.

16. The method of claim 15, wherein the indications include an animal in a sleeping state indicating that the speech control unit is not active, and in an awake state indicating that the speech control unit is in the active state.

17. The method of claim 16, wherein progress of the active state is indicated by an angle of ears of the animal.

18. The method of claim 17, wherein the ears are fully raised at a beginning of the active state, and fully down at an end of the active state.

19. The method of claim 16, wherein the animal has an understanding look when the utterance is recognized and a puzzled look when the utterance is not recognized.

* * * * *